March 24, 1959 H. C. WENDT 2,879,415
ELECTROMAGNETIC TELEMETERING DEVICE AND
METHOD OF MANUFACTURE
Filed Dec. 20, 1955 2 Sheets-Sheet 1

Inventor:
Harry C. Wendt
by, Richard E. Horley
His Attorney

March 24, 1959

H. C. WENDT 2,879,415

ELECTROMAGNETIC TELEMETERING DEVICE AND
METHOD OF MANUFACTURE

Filed Dec. 20, 1955

Inventor:
Harry C. Wendt
by, Richard E. Horley
His Attorney

United States Patent Office 2,879,415
Patented Mar. 24, 1959

2,879,415

ELECTROMAGNETIC TELEMETERING DEVICE AND METHOD OF MANUFACTURE

Harry C. Wendt, Lynnfield Center, Mass., assignor to General Electric Company, a corporation of New York Application December 20, 1955, Serial No. 554,285

8 Claims. (Cl. 310—42)

This invention relates to improved electromagnetic devices and, more particularly, to improved telemetering units, such as magnetic field detectors, employing the saturable characteristics of a material having a high magnetic permeability.

Magnetic field detectors utilizing the saturable characteristics of a high permeability material to create a double frequency alternating signal from an external magnetic field are known in the art. Such detectors may include one or more circular laminations of a material having a high magnetic permeability and low coercive force. Toroidally wound about the laminations are positioned a primary excitation winding and a secondary polyphase winding, usually connected in a three-phase selsyn manner. The operation of such a detector is as follows: The detector arrangement is suspended within the magnetic field to be measured, usually the earth's field, and the primary winding is excited with alternating current to a level sufficient to saturate the laminations periodically. This has the effect of reducing the permeability of the laminations twice during each cycle of the excitation current thereby alternately directing a portion of the external magnetic field into and out of the laminations twice during each cycle. As a result there is induced in the secondary winding a pattern of signals twice the frequency of the applied excitation current, the phases and amplitudes of which are characteristic of the direction and strength of the external magnetic field. Since the secondary winding will in general link the excitation flux, the output therefrom will also contain the fundamental excitation frequency as well as its harmonics. The fundamental frequency may be eliminated to a large extent by various methods such as, for example, dividing the secondary winding of a three-phase system into six sub-sections, diametrically opposite pairs being connected in series opposition; if the laminations are saturated circumferentially by the primary winding, the fundamental signals in the secondary winding will cancel out, but the second harmonic signals resulting from the external magnetic field will be additively combined. The output signal may then be applied to a suitable detector arrangement and used to position a compass card, to slave a gyro, or to perform other related functions.

Materials suitable for use in the laminations of transmitters such as the foregoing are generally selected on the basis of physical characteristics such as a high magnetic permeability and low coercive force. Unfortunately, it is usually found that materials exhibiting these required characteristics to the desired degree require very careful annealing processes in order to develop these properties and, after annealing, must be handled gently to preserve their inherently high permeability. Shock or stress will alter the properties of these materials and seriously impair the efficiency of an instrument employing them by altering the magnetic symmetry of the laminations and introducing noise into the electrical system in the form of harmonics of the applied signal. Furthermore, even with the most careful handling of the lamination materials, there will be present in the completed instrument dissymmetries and other sources of noise. Strains are necessarily and unavoidably transmitted to the lamination structure during the assembly operation, for example, when the primary and secondary windings are being positioned on the lamination structure and when the subassembly is fixed to its support structure. Changes in temperature, too, will cause differential expansion and contraction between elements of the instrument resulting in stresses which may affect the accuracy of the system.

Accordingly, one of the objects of this invention is to provide an improved telemetering unit with a saturable core structure having a high degree of permeability which will retain to a maximum degree its desirable magnetic properties through normal assembly operations and under changing external conditions.

This invention has as another of its objects to provide a method of manufacturing a telemetering unit to develop and maintain its magnetic properties to a maximum degree.

Another object of this invention is to provide an improved electromagnetic telemetering unit which is adjustable to reduce the noise in its output signal.

A further object of this invention is to provide an improved magnetic field detector having an inherently high signal-to-noise ratio in its secondary winding.

By way of a brief summary of one aspect of the invention, there is provided in a magnetic field detector a pair of ring-shaped laminations of a material having a high degree of magnetic permeability and a low coercive force. There is also provided a channeled annular supporting core formed of a non-magnetic material having a temperature coefficient of expansion comparable to that of the lamination material. Each of the laminations is supported within a separate channel of the core and protected by surrounding flanges. The flanges fit the laminations closely, but not so closely as to prevent the laminations from being turned in their channels. A subassembly is thus formed which may be annealed as a unit to develop the desirable magnetic properties of the laminations. A cover of non-metallic material is placed over each channel. Projections on the cover provide convenient means for spacing the winding segments, and apertures in the cover at various locations permit access to the laminations for adjustment purposes. Each of the windings is composed of an even number of segments. All primary winding segments are connected electrically in series aiding relationship so that an alternating current signal therein of the proper magnitude induces a changing circumferential flux which periodically saturates the laminations. Diametrically opposite pairs of the secondary winding segments, which are wound directly over the primary segments, are connected in series opposition so that the potentials induced therein by the changing circumferential flux are equal in magnitude but opposite in polarity, thus cancelling each other.

While the scope of this invention is not to be limited, except by a fair interpretation of the appended claims, the details of the invention, as well as further objects and advantages may best be understood in connection with the drawings wherein:

Figures 1, 2:
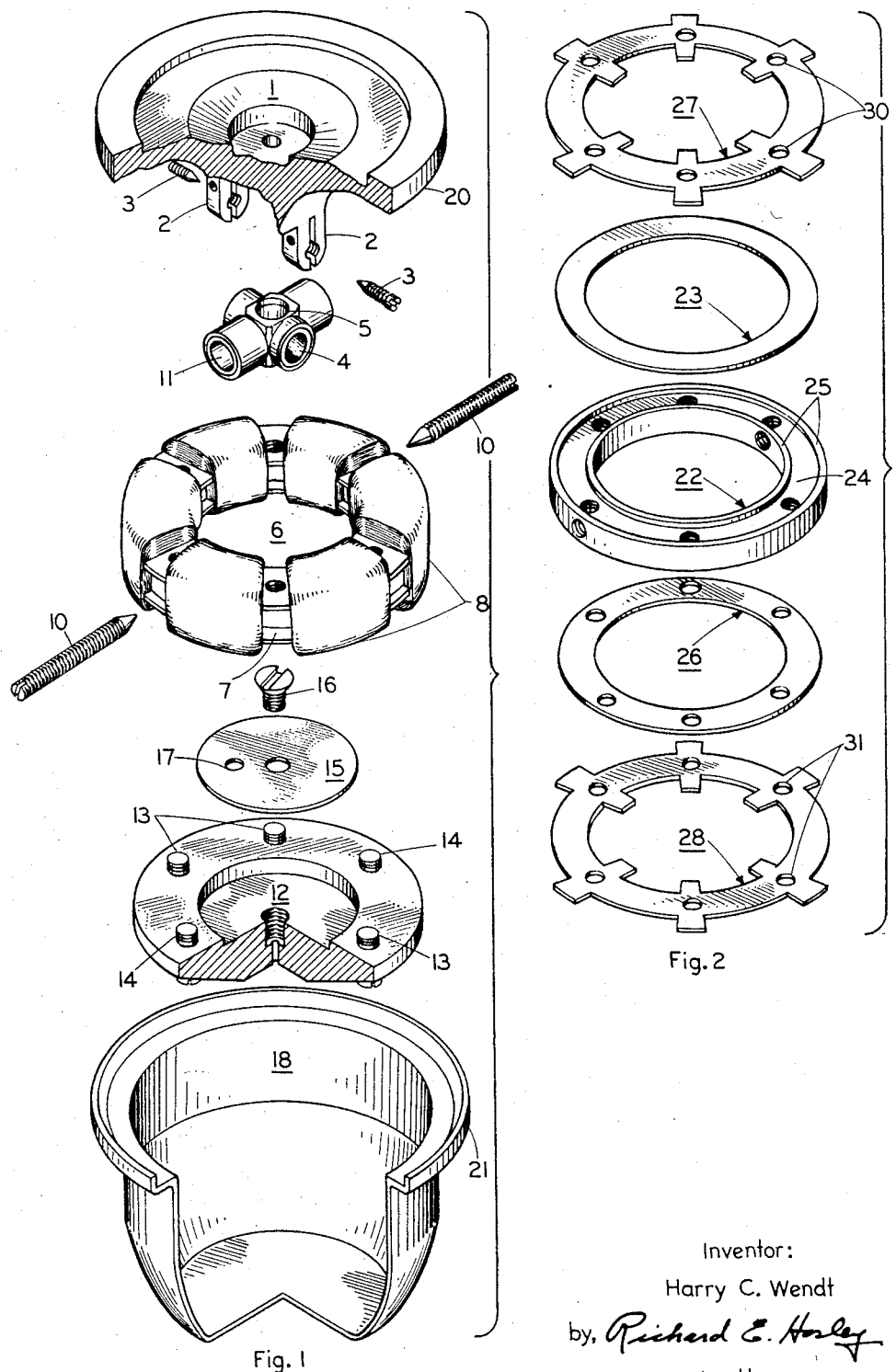
Figure 1 represents an exploded pictorial view of an improved magnetic field transmitter constructed in accordance with this invention.
Figure 2 represents an exploded pictorial view of a lamination structure constructed in accordance with this invention.

Referring now to Figure 1 of the drawings, there is provided a suspension frame 1 having dependent legs 2 in which are inserted pivot pins 3. Bearings 4 support gimbal 5 for rotation about the axis of pivot pins 3. Transmitter assembly 6 including core structure 7 and segmented toroidal coils 8 are supported by means of pivot pins 10 which in turn engage bearings 11 of the gimbal. The vertical axis of transmitter 6 must be perpendicular to the plane of the field being measured. In the case of a compass, this means that the axis of rotation must coincide with the vertical. This is achieved by the provision of pendulous weight 12, formed of a heavy non-magnetic material, supported from core structure 7 by means of screws 13. Screws 14 are provided as clamping elements for pivot pins 10 to ensure permanence of adjustment. Wafer 15 is attached to pendulous element 12 by means of a screw 16 leaving a space between wafer 15 and the pendulous element. An aperture 17 is provided in the wafer for reasons which will become apparent. The entire foregoing structure is inserted within cup 18 so that the outer lip 20 of frame 1 rests within flange 21 of the cup. The cup may be filled with a suitable damping fluid preventing unnecessary oscillation of the transmitter structure.

The core structure 7 of the transmitter is illustrated in Figure 2 in an exploded view as comprising a supporting core 22 having a channel 24 surrounded by flanges 25. A similar channel is also provided on the opposite side of this member. Laminations 23 and 26, formed of a material having an inherently high magnetic permeability are seated within the channels of the core structure. The dimensions of the laminations and their channels are chosen for a close but not tight fit and the material of core 22 is selected to have a temperature coefficient of expansion as close as possible to that of laminations 23 and 26. For my part, I prefer to construct the laminations of a material available commercially under the name of Mumetal and having a composition of approximately 75% nickel, 18% iron, 5% copper and 2% chromium. As a supporting core material I prefer an alloy available commercially under the name of Monel type K and having a composition of about 66% nickel, 29% copper, 2.75% aluminum, 1.0% silicon, 0.9% iron, 0.85% manganese, and 0.15% carbon. It is to be understood, however, that other combinations of materials may be used in place of these preferred materials without departing either in spirit or in scope from this invention. Covering the channels and laminations are fibrous elements 27 and 28 provided with apertures 30 and 31 respectively. The purpose of apertures 31 is to permit the screws 13 and 14 to pass through to the core 22, but apertures 30 have different purposes soon to be described.

A core structure constructed in the manner above described has several attendant advantages. Such a construction permits the laminations and support core to be annealed as a unit to develop the desired characteristics of the lamination material. In successive handling and assembly operations, therefore, the laminations will be constantly protected against shock and stress by the encompassing channelled core, thereby preserving to a maximum degree their desirable magnetic properties. I have found, also, that by spacing the laminations apart from each other, a much greater signal output is available from a device of this general character than would be derived therefrom if the same laminations were merely stacked on one another in a conventional manner.

There may develop in the initial stages of manufacture dissymmetries in the lamination structure, regardless of the care with which the annealing process and subsequent operations are carried out. These dissymmetries will present themselves as areas within the laminations in which the permeability of the material varies from that of the average value. Variations of this nature will manifest themselves in the form of noise signals in the output of the transmitter device, which signals may be cancelled to some extent by various methods. By providing apertures 30 in the fibrous cover 27, the laminations 23 may be lightly prick-punched at various places about the periphery, thereby changing the permeability of the lamination and reducing the noise level. Furthermore, the dissymmetries of one lamination may be utilized to cancel those of the other by rotating one lamination with respect to the other until the overall noise level is at a minimum. Since the laminations are mounted, as previously stated, for a close but not tight fit within the channels, it is possible through apertures 30 to rotate the upper lamination to accomplish this adjustment.

When the noise level is at a minimum, a drop of lacquer may be inserted through one of the apertures to "stake" the lamination in its channel and prevent further rotation.

Figure 3:
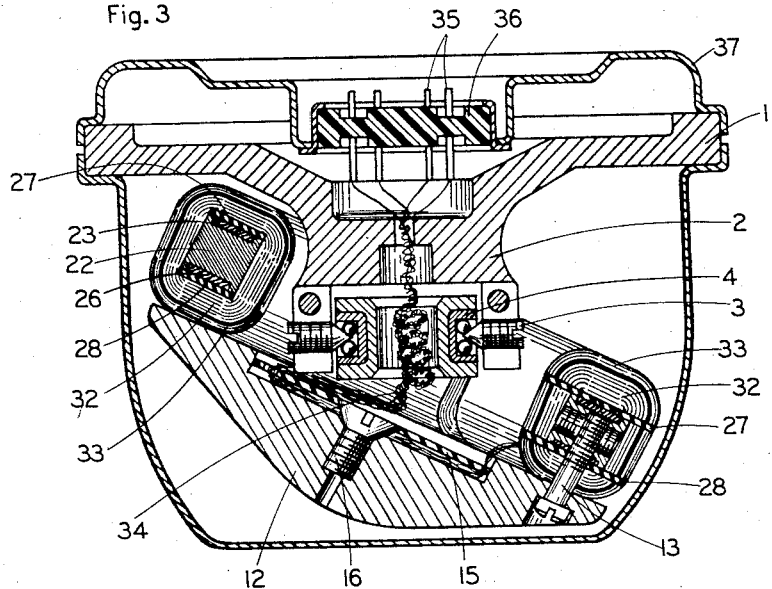
Figure 3 is a cross section view of the assembled magnetic field detector shown in Figure 1.

After assembly of the core structure, primary excitation windings 32 and secondary polyphase windings 33 may be positioned on the core structure as shown in Figure 3 in which the cross-sectional view is shown as intersecting the core and coil structure within a coil on the left and between coils on the right. It is important to note that at no time during the assembly of this instrument are strains or stresses transmitted to the laminations themselves, but that even the windings are supported solely by the core 22 leaving the laminations gently nested within their channels. The electrical leads from the windings are passed beneath wafer 15 through aperture 17 and gimbal 5 to hermetically sealed terminals 35 in ceramic plug 36.

Figure 4:
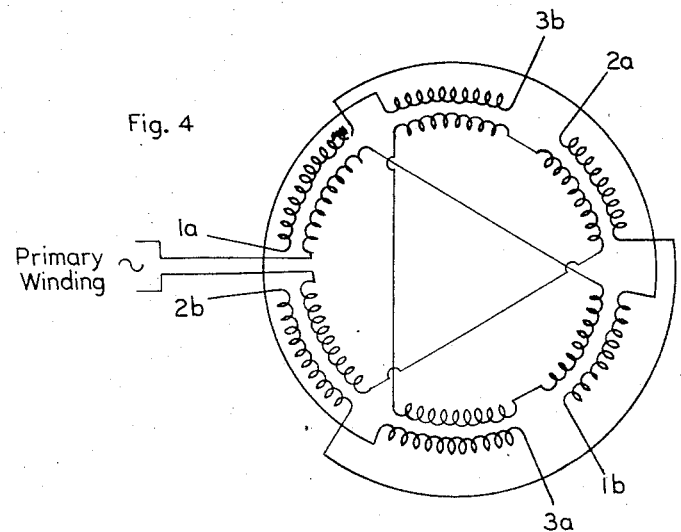
Figure 4 is a schematic diagram of a proposed connection arrangement for the primary and secondary winding segments particularly useful in connection with this invention.

With the winding arrangement shown in Figure 4, an alternating current excitation signal in the primary winding will periodically saturate the laminations producing a circumferential flux. If an external magnetic field is applied to the transmitter, the periodic saturation of the laminations will force the external field to pulsate into and out of the core structure twice during each complete cycle of the excitation current. This pulsation will produce in each of the secondary winding segments a second harmonic signal resulting in a pattern of phase and amplitude differentiated potentials representative of the strength and direction of the external magnetic field. Since opposite pairs of the secondary winding are connected in series opposition, the fundamental frequency signal induced in one half of the pair will be equal to, but opposite in polarity from that of the other half of the pair. The fundamental frequency signal appearing in the output will therefore be to a large extent cancelled out. On the other hand, since the external magnetic field must traverse the core material in opposite directions on each side of the core, the signals resulting therefrom in each half of a pair of secondary segments will be additively combined. The secondary windings may be externally connected in wye or delta depending upon the polyphase system in which the magnetic detector is to be used.

The magnetic properties of a telemetering unit constructed in accordance with the principles of this invention are not easily subject to change as a result of shock and stresses transmitted to the core structure during and after assembly. Furthermore, such dissymmetries as do exist in the magnetic elements may be easily compensated for after assembly of the unit. The device may be operated throughout a wide range of temperature conditions with little change in operating characteristics. Because this construction results in a telemetering unit having an inherently high signal-to-noise ratio in the secondary winding, the dimensions of the unit may be very small in comparison with conventional units, thereby permitting the installation of compass transmitters of this nature in confined spaces such as are found in the thin wings of modern aircraft.

The teachings of this invention, though illustrated in connection with a particular magnetic field detector, are equally applicable to other telemetering units including receivers as well as transmitters. For example, a second harmonic type receiver in all respects similar to the transmitter shown and described and having a pair of magnets pivotally suspended at the center of the toroid may be connected to receive in its secondary windings a second harmonic polyphase, position-characterized signal from a synchro transmitter. If, then, the primary winding is excited by a single-phase fundamental signal which periodically saturates the core structure, there will result a pulsating unidirectional field across the diameter of the receiver core. The magnets, which may be mechanically connected to perform various functions such as rotating a compass card, to mention only one, will then tend to align themselves with the pulsating field. A receiver of this type may be connected with a transmitter of the sort previously described to form a complete remote-indicating compass system. It is to be understood that a telemetering unit constructed in accordance with my invention may also be used in conjunction with other known types of telemetering units and in other known telemetering systems.

Numerous constructions of telemetering units may be devised within the scope of these teachings. It is obvious, for example, that the laminations need not be two in number; nor is it essential that they be wafer-shaped. The highly permeable elements could be, in one modification, in the form of cylinders of different diameter suspended one inside of another, with attendant modifications of the support core. The entire structure could be polygonal as long as its shape remains generally circular and the windings may likewise be of a different nature.

It should thus be apparent that the specific embodiments of this invention disclosed herein are of a descriptive rather than a limiting nature and that various changes, combinations, additions or substitutions may be made in accordance with these teachings without departing in spirit or in scope from the invention as set forth in the appended claims.

What I claim as new and desire to secure by Letters Patent of the United States is:

1. A telemetering unit utilizing the saturable characteristics of a magnetic material comprising a core structure having at least two generally circular elements composed of a material having an inherently high magnetic permeability; a non-magnetic support structure partially enveloping said elements and supporting them in coaxial positions, the dimensions of the partially enveloping portions of said support structure being only slightly larger than those of said elements to permit adjustable coaxial displacements of said elements relative to one another with a minimum of permissible translatory movement; and winding means comprised of a plurality of winding segments supported by said support structure encircling said elements and spaced apart to permit access to said elements at portions where said elements are not completely enveloped by said supporting structure.

2. A toroidal-type telemetering unit comprising: at least two generally circular laminations composed of a material having inherently high magnetic permeability; support means formed of a non-magnetic material having a temperature coefficient of expansion comparable over a selected temperature range to that of said lamination material and having circular channels therein partially enclosing said laminations and supporting them in spaced-apart, coaxial positions, the dimensions of said channels being only slightly larger than those of said laminations to permit adjustable coaxial displacements of said laminations relative to one another with a minimum of permissible translatory movement and in an unstrained condition over a selected temperature range; and winding means toroidally wound in spaced apart segments about said laminations and positioned on said supporting means permitting access to said laminations between winding segments.

3. A toroidal-type telemetering unit comprising a plurality of generally circular elements composed of a material having inherently high magnetic permeability, support means partially enveloping said elements and supporting them loosely in spaced apart coaxial positions, said support means being formed of a non-magnetic material having a temperature coefficient of expansion comparable over a selected temperature range to that of said highly permeable material, and winding means toroidally wound in segments about said elements and supported by said support means, access to said elements being permitted between segments of said winding means.

4. A saturable core structure comprising a pair of annular laminations composed of a material having inherently high magnetic permeability, an annular core of non-magnetic material, the temperature coefficient of expansion of which is comparable over a selected temperature range to that of said lamination material, a pair of circular flanges on each face of said core forming annular channels therebetween of dimensions slightly larger than those of said laminations, said laminations being positioned in and adjustably rotatable within said channels.

5. A toroidal-type electromagnetic telemetering unit comprising a pair of annular laminations composed of a material having inherently high magnetic permeability; an annular core of non-magnetic material, the temperature coefficient of expansion of which is comparable over a selected temperature range to that of said lamination material; a pair of circular flanges on opposite faces of said core forming annular channels therebetween of dimensions only slightly larger than those of said laminations, said laminations being positioned in and rotatable within said channels; and winding means comprising a plurality of spaced apart coil segments toroidally wound about said laminations and core supported by said core and permitting access to at least one of said laminations between segments.

6. A magnetic field direction transmitter comprising: an annular core of non-magnetic material, circular flanges on opposite faces of said core forming circular channels therebetween, a circular lamination seated in each of said channels and protected by said flanges, said laminations being of a material having a relatively high magnetic permeability, said core being formed of a non-magnetic material having a temperature coefficient of expansion comparable over a selected temperature range to that of said lamination material, primary and secondary segmented windings on said core permitting access to said laminations between segments, and means attached to said core supporting said core, laminations, and windings.

7. The method of producing a magnetically symmetrical saturable core type telemetering unit comprising the steps of mounting at least one core element formed of a material having a high degree of magnetic permeability and requiring an annealing process to develop its permeability to a maximum degree in an unstrained condition within a support structure formed of a non-magnetic material having a temperature coefficient expansion comparable over a select temperature range to that of said core element, annealing said core element and support structure as a unit to develop the magnetic properties of said core element to a desired degree, and thereafter adjusting the magnetic symmetry of said core element by physically stressing selected portions of said core element and by adjustably rotating one of said elements with respect to another.

8. The method of producing a magnetically symmetrical saturable core type telemetering unit comprising the steps of coaxially mounting at least two circular core elements formed of a material having a high degree of permeability and requiring an annealing process to develop its permeability to a maximum degree in an unstrained condition within a support structure formed of a nonmagnetic material having a temperature coefficient of expansion comparable over a selected temperature range to that of said core elements, annealing said core elements and support structure as a unit to develop the magnetic properties of said core elements to a desired degree, and thereafter adjusting the magnetic symmetry of said core elements by physically rotating one of said elements with respect to another.

References Cited in the file of this patent

UNITED STATES PATENTS

| | | |
|---|---|---|
| 2,422,591 | Sigmund | June 17, 1947 |
| 2,658,113 | Holmes | Nov. 3, 1953 |